United States Patent
Wei (10) Patent No.: US 10,818,291 B2
(45) Date of Patent: Oct. 27, 2020

(54) METHOD AND APPARATUS FOR INTERACTING INFORMATION

(71) Applicant: Baidu Online Network Technology (Beijing) Co., Ltd., Beijing (CN)

(72) Inventor: Likai Wei, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 116 days.

(21) Appl. No.: 16/241,188

(22) Filed: Jan. 7, 2019

(65) Prior Publication Data
US 2019/0392829 A1    Dec. 26, 2019

(30) Foreign Application Priority Data
Jun. 21, 2018 (CN) .......................... 2018 1 0644174

(51) Int. Cl.
| | |
|---|---|
| *G10L 15/00* | (2013.01) |
| *G10L 15/25* | (2013.01) |
| *G10L 15/22* | (2006.01) |
| *H04W 12/00* | (2009.01) |
| *G10L 13/04* | (2013.01) |
| *G10L 15/18* | (2013.01) |
| *G10L 15/30* | (2013.01) |

(52) U.S. Cl.
CPC ............ *G10L 15/22* (2013.01); *G10L 13/043* (2013.01); *G10L 15/1822* (2013.01);
(Continued)

(58) Field of Classification Search
CPC ....... G06F 3/167; G10L 13/00; G10L 13/043; G10L 15/1822; G10L 15/22; G10L 15/26;
(Continued)

(56) References Cited

U.S. PATENT DOCUMENTS 8,589,271 B2 * 11/2013 Evans .................... G06Q 20/10
705/35
9,226,119 B2 * 12/2015 Suryavanshi ......... H04L 67/125
(Continued)

FOREIGN PATENT DOCUMENTS

| | | |
|---|---|---|
| CN | 106357412 A | 1/2017 |
| CN | 106411849 A | 2/2017 |

OTHER PUBLICATIONS

First Chinese Office Action dated Jul. 10, 2019 for Chinese Patent Application No. CN 201810644174.X, which cites the above-identified reference No. 1, and from which priority is claimed by subject U.S. Application No. 16/241,188.

*Primary Examiner* — Khai N. Nguyen
(74) *Attorney, Agent, or Firm* — Knobbe, Martens, Olson & Bear, LLP (57) ABSTRACT

Embodiments of the present disclosure relate to a method and apparatus for interacting information. A specific implementation of the method can include: receiving information inputted by a user, the information including a name and a password of a wireless routing device; combining the information into a character string according to a predetermined format; encrypting the character string into a numeric string; and converting the numeric string from text to speech to obtain an audio, and playing the audio, so that a target smart speaker monitoring the audio recognizes the numeric string after performing speech recognition on the audio, decrypts the recognized numeric string to obtain the character string, parses the name and the password of the wireless routing device from the character string obtained by decrypting, and connects to the wireless routing device by using the parsed name and password of the wireless routing device.

16 Claims, 5 Drawing Sheets

(52) U.S. Cl.
CPC ......... *G10L 15/30* (2013.01); *H04W 12/0013* (2019.01); *G10L 2015/223* (2013.01)

(58) Field of Classification Search
CPC ............... G10L 15/30; G10L 2015/223; H04L 2209/805; H04L 63/083; H04L 9/3226; H04W 12/0013; H04W 12/06
USPC ........................................................ 704/235
See application file for complete search history.

(56) References Cited

U.S. PATENT DOCUMENTS

| | | | |
|---|---|---|---|
| 9,369,945 B2* | 6/2016 | Suyama | H04L 63/06 |
| 10,351,240 B1* | 7/2019 | Sills | G05D 1/0088 |
| 2006/0234680 A1* | 10/2006 | Doulton | H04L 51/38 |
| | | | 455/412.1 |
| 2007/0054678 A1* | 3/2007 | Doulton | H04W 4/12 |
| | | | 455/466 |
| 2010/0115262 A1* | 5/2010 | Suyama | H04L 63/20 |
| | | | 713/150 |
| 2011/0055585 A1* | 3/2011 | Lee | H04L 9/0844 |
| | | | 713/183 |
| 2013/0024916 A1* | 1/2013 | Evans | G06Q 20/4014 |
| | | | 726/5 |
| 2016/0087811 A1* | 3/2016 | Yin | H04W 48/16 |
| | | | 370/312 |
| 2016/0262039 A1* | 9/2016 | Suyama | H04W 12/003 |
| 2017/0235955 A1* | 8/2017 | Barkan | G06F 21/57 |
| | | | 726/11 |
| 2019/0059120 A1* | 2/2019 | Brennan | H04W 48/20 |
| 2019/0392829 A1* | 12/2019 | Wei | G10L 15/30 |

* cited by examiner

METHOD AND APPARATUS FOR INTERACTING INFORMATION

CROSS-REFERENCE TO RELATED APPLICATIONS

This application claims priority to Chinese Patent Application No.201810644174.X, filed with the China National Intellectual Property Administration (CNIPA) on Jun. 21, 2018, the entire disclosure of which is incorporated herein by reference in its entirety.

TECHNICAL FIELD

Embodiments of the present disclosure relate to the field of smart speaker technologies, and specifically to a method and apparatus for interacting information.

BACKGROUND

Smart speaker is an upgrade product of speaker. It is a tool for household consumers to access the Internet using speech, such as requesting on-demand songs, online shopping, or requesting weather forecasting. It may also control smart home devices, such as opening curtains, setting the temperature of the refrigerator, and make the water heater heat up in advance.

When a network on which the smart speaker relies is used first time, the user is required to do many configuring work for the speaker. The conventional method is mainly to broadcast the password to a currently connected wireless router through a mobile phone.

SUMMARY

Embodiments of the present disclosure provide a method and apparatus for interacting information.

In a first aspect, the embodiments of the present disclosure provide a method for interacting information, applied to a terminal, the method including: receiving information inputted by a user, the information including a name and a password of a wireless routing device; combining the information into a character string according to a predetermined format; encrypting the character string into a numeric string; and converting the numeric string from text to speech to obtain an audio, and playing the audio, so that a target smart speaker monitoring the audio recognizes the numeric string after performing speech recognition on the audio, decrypts the recognized numeric string to obtain the character string, parses the name and the password of the wireless routing device from the character string obtained by decrypting, and connects to the wireless routing device by using the parsed name and password of the wireless routing device.

In some embodiments, the encrypting the character string into a numeric string includes: encrypting the character string to obtain a ciphertext in numeric form; and adding a predetermined prefix numeric string preceding the ciphertext, and adding a predetermined suffix numeric string succeeding the ciphertext, to generate the numeric string.

In some embodiments, the information further includes a user identifier of the user.

In a second aspect, the embodiments of the present disclosure provide a method for interacting information, applied to a smart speaker, the method including: performing, in response to monitoring an audio played by a terminal, speech recognition on the audio to obtain a numeric string, where the audio is obtained by: the terminal combines information inputted by a user into a character string according to a predetermined format, and encrypts the character string to generate a numeric string, and then converts the numeric string from text to speech, the information includes a name and a password of a wireless routing device; decrypting the numeric string obtained by speech recognition to obtain the character string; parsing, according to the predetermined format, the name and the password of the wireless routing device from the character string obtained by decrypting; and connecting to the wireless routing device by using the parsed name and password of the wireless routing device.

In some embodiments, the numeric string includes a predetermined prefix numeric string and a predetermined suffix numeric string; and the decrypting the numeric string obtained by speech recognition to obtain the character string, includes: deleting the predetermined prefix numeric string and the predetermined suffix numeric string from the numeric string obtained by speech recognition to obtain a target numeric string; and decrypting the target numeric string, to obtain the character string.

In some embodiments, the information inputted by the user further includes a user identifier of the user; and the method further includes: parsing the user identifier from the character string obtained by decrypting; and sending the user identifier to a target server for identity authentication.

In some embodiments, the method further includes: acquiring a device identifier of the smart speaker; and sending the device identifier to the target server to bind the device identifier and the user identification.

In a third aspect, the embodiments of the present disclosure provide an apparatus for interacting information, applied to a terminal, the apparatus including: a receiving unit, configured to receive information inputted by a user, the information including a name and a password of a wireless routing device; a combining unit, configured to combine the information into a character string according to a predetermined format; an encryption unit, configured to encrypt the character string into a numeric string; and a converting unit, configured to convert the numeric string from text to speech to obtain an audio, and play the audio, so that a target smart speaker monitoring the audio recognizes the numeric string after performing speech recognition on the audio, decrypts the recognized numeric string to obtain the character string, parses the name and the password of the wireless routing device from the character string obtained by decrypting, and connects to the wireless routing device by using the parsed name and password of the wireless routing device.

In some embodiments, the encryption unit is further configured to: encrypt the character string to obtain a ciphertext in numeric form; and add a predetermined prefix numeric string preceding the ciphertext, and add a predetermined suffix numeric string succeeding the ciphertext, to generate the numeric string.

In some embodiments, the information further includes a user identifier of the user.

In a fourth aspect, the embodiments of the present disclosure provide an apparatus for interacting information, applied to a smart speaker, the apparatus including: a recognition unit, configured to perform, in response to monitoring an audio played by a terminal, speech recognition on the audio to obtain a numeric string, where the audio is obtained by: the terminal combines information inputted by a user into a character string according to a predetermined format, and encrypts the character string to generate a numeric string, and then converts the numeric string from text to speech, the information includes a name and a password of a wireless routing device; a decryption unit, configured to decrypt the numeric string obtained by speech recognition to obtain the character string; a parsing unit, configured to parse the name and the password of the wireless routing device, according to the predetermined format, from the character string obtained by decrypting; and a connection unit, configured to connect to the wireless routing device by using the parsed name and password of the wireless routing device.

In some embodiments, the numeric string includes a predetermined prefix numeric string and a predetermined suffix numeric string; and the decryption unit is further configured to: delete the predetermined prefix numeric string and the predetermined suffix numeric string from the numeric string obtained by speech recognition, to obtain a target numeric string; and decrypt the target numeric string to obtain the character string.

In some embodiments, the information inputted by the user further includes a user identifier of the user; and the apparatus further includes an authentication unit, configured to: parse the user identifier from the character string obtained by decrypting; and send the user identifier to a target server for identity authentication.

In some embodiments, the apparatus further includes a binding unit, configured to: acquire a device identifier of the smart speaker; and send the device identifier to the target server to bind the device identifier and the user identification.

In a fifth aspect, the embodiments of the present disclosure provide an electronic device, including: one or more processors; and a storage apparatus, storing one or more programs thereon, the one or more programs, when executed by the one or more processors, cause the one or more processors to implement the method according to any one of the embodiments in the first aspect.

In a sixth aspect, the embodiments of the present disclosure provide a computer readable medium, storing a computer program thereon, the computer program, when executed by a processor, implements the method according to any one of the embodiments in the first aspect.

The method and apparatus for interacting information provided by the embodiments of the present disclosure combine and encrypt the name and the password of the wireless routing device inputted by the user into a numeric string, and then convert the numeric string into an audio for playing, so that the smart speaker monitoring the audio extracts from the audio the name and the password of the wireless routing device to establish a network connection. The embodiments of the present disclosure notify the smart speaker the name and the password of the wireless routing device by playing the audio. Therefore, it is possible to avoid a situation in which the network configuration failure occurs due to the failure in sending the broadcast message including the name and the password of the wireless routing device due to congestion of the router network and the like, thereby improving the success rate of configuring the network connection of a smart speaker.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
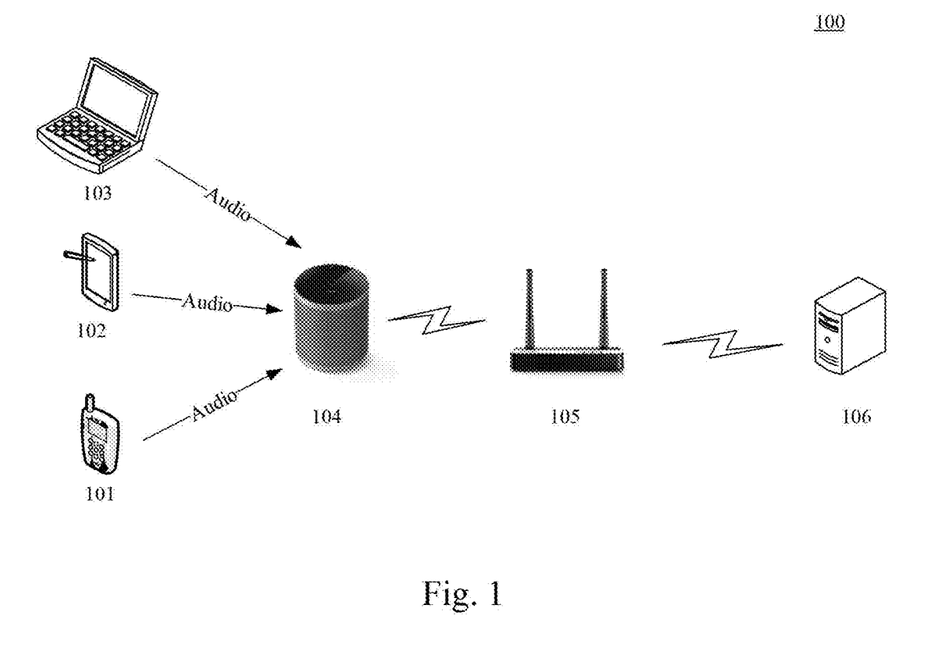
FIG. 1 is a system architecture diagram to which an embodiment of the present disclosure may be applied.

FIG. 1 illustrates a system architecture 100 to which an embodiment of a method for interacting information or an apparatus for interacting information of the present disclosure may be applied.

As shown in FIG. 1, the system architecture 100 may include terminal devices 101, 102, 103, a smart speaker 104, a wireless router 105 and a server 106. The wireless router 105 and the server 106 are connected through a wireless link.

A user may input the name and the password of the wireless routing device 105 using the terminal devices 101, 102, 103 and then convert it into an audio for playing. The smart speaker 104 monitors the audio played by the terminal devices 101, 102, 103, and extracts the name and the password of the wireless routing device 105 therefrom. The smart speaker 104 is connected to the wireless routing device 105 according to the name and the password of the wireless routing device 105. Various communication client applications, such as a network configuration application, a web browser application, a shopping application, a search application, an instant communication tool, a mailbox client, and social platform software, may be installed on the terminal devices 101, 102, and 103.

The terminal devices 101, 102 and 103 may be hardware or software. When the terminal devices 101, 102 and 103 are hardware, they may be various electronic devices having display screens and supporting information input and audio playback, including but not limited to smart phones, tablet computers, e-book readers, MP3 players (Moving Picture Experts Group Audio Layer III), MP4 (Moving Picture Experts Group Audio Layer IV) players, laptops portable computers, desktop computers and the like. When the terminal devices 101, 102 and 103 are software, they may be installed in the above-listed electronic devices. They may be implemented as a plurality of software or software modules (for example, for providing distributed services), or may be implemented as a single software or software module, which is not specifically limited here.

The smart speaker 104 is a speaker that can be connected to a wireless network and can monitor audio for speech recognition.

The server 106 may be a server that provides various services, such as a backend registration server that registers user identifications of the terminal devices 101, 102, 103. The backend registration server may bind data such as the received user ID and the device identifier of the smart speaker.

It should be noted that the server may be hardware or software. When the server is hardware, it may be implemented as a distributed server cluster composed of multiple servers, or may be implemented as a single server. When the server is software, it may be implemented as a plurality of software or software modules (for example, software or software modules for providing distributed services), or as a single software or software module, which is not specifically limited here.

It should be noted that the method for interacting information provided by the embodiments of the present disclosure may be executed by the terminal devices 101, 102, 103, or may be executed by the smart speaker 104. Accordingly, the apparatus for interacting information may be provided in the terminal devices 101, 102, 103 or may be provided in the smart speaker 104, which is not specifically limited here.

It should be appreciated that the numbers of the terminal devices, the smart speakers, the wireless routing devices and the servers in FIG. 1 are merely illustrative. Any number of terminal devices, smart speakers, wireless routing devices and servers may be provided based on the actual requirements.

Figure 2:
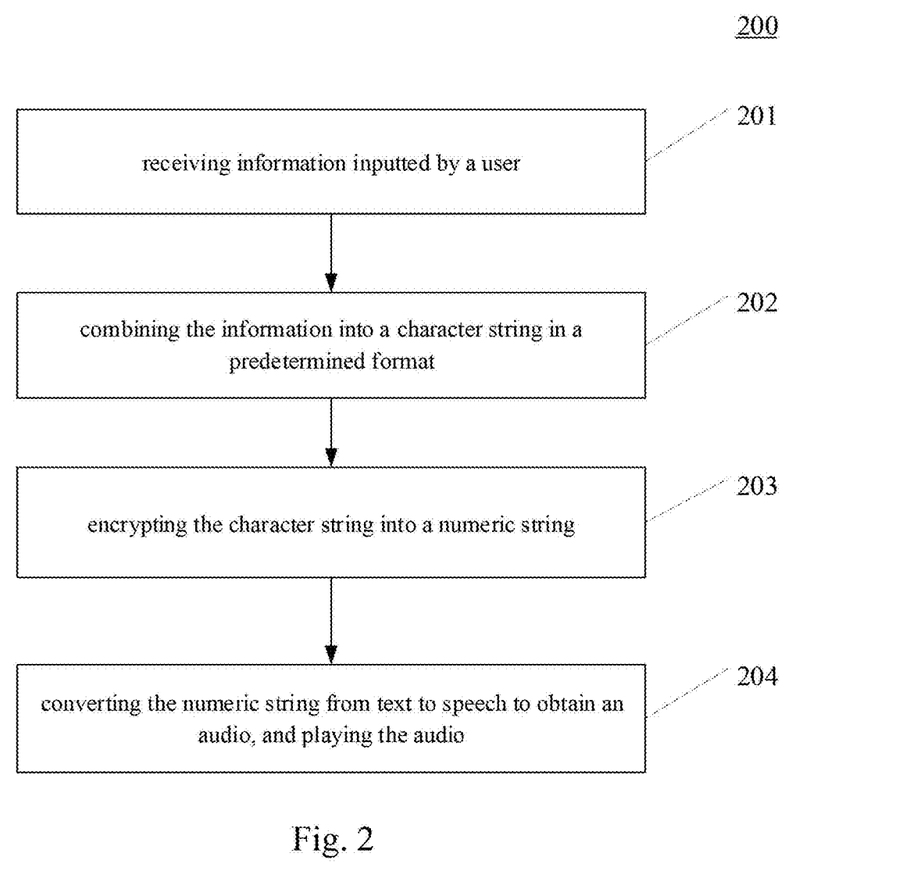
FIG. 2 is a flowchart of an embodiment of a method for interacting information according to the present disclosure.

With further reference to FIG. 2, a flow 200 of an embodiment of a method for interacting information according to the present disclosure is illustrated. The method for interacting information is applied to a terminal, and includes the following steps:

Step 201, receiving information inputted by a user.

In the present embodiment, the user may input information in an execution body (for example, the terminal device shown in FIG. 1) of the method for interacting information. The information includes: the name and the password of a wireless routing device. The wireless routing device refers to a router with wireless coverage that a smart speaker may connect to for the user to access the Internet. The terminal may list searched wireless routing devices for the user to select. The user terminal may pre-store the passwords of the wireless routing devices. The user may also manually enter the name and the password of the wireless routing device when configuring the network for the smart speaker. If the user does not specify a wireless routing device, the terminal may directly use the name and the password of the wireless routing device to which the terminal is currently connected as the input information.

In some alternative implementations of the present embodiment, the information further includes a user identifier of the user. The user identifier may be used for identity authentication. It may also be used to bind the terminal to the smart speaker.

Step 202, combining the information into a character string according to a predetermined format.

In the present embodiment, since the lengths of tge name and the password of the wireless routing device are not fixed, the name and the password of the wireless routing device may be combined into a character string by adding a fixed separator. For example, the name of the wireless routing device is "WIF1801A" and the password is "654321". A character string "WIF1801A, 654321" may be combined using a comma for separation. When the character string is parsed, the comma may be used as the separator to extract the name and the password respectively.

In some alternative implementations of the present embodiment, the information includes a user identifier, and therefore, a character string including the user identifier is combined.

Step 203, encrypting the character string into a numeric string.

In the present embodiment, the character string may be encrypted and converted into a numeric string by an algorithm such as symmetric encryption. For example, W is used to indicate the name of the wireless routing device, P is used to indicate the password of the wireless routing device, and T is used to indicate the user identifier of the current user. It is also possible to form a character string with only W and P. The encryption method is represented by F (string), and the decryption method is represented by F' (string). The encryption function F satisfies that the input of an arbitrary character string returns a simple character (such as a numeric string composed of numbers 0-9) that can be broadcast by TTS (TextToSpeech, from text to speech).

The encryption process may be expressed as:

$$X=F(W+P)$$

Here, X is the numeric string, F is the encryption function, and W+P is the character string.

Alternatively, the information may also include the user ID, and W, P, and T may form a character string. Then, the encryption process may be expressed as:

$$X=F(W+P+T)$$

Here, X is the numeric string, F is the encryption function, and W+P+T is the character string.

In some alternative implementations of the present embodiment, the encrypting the character string into a numeric string includes: encrypting the character string to obtain a ciphertext in numeric form; and adding a predetermined prefix numeric string preceding the ciphertext, and adding a predetermined suffix numeric string succeeding the ciphertext, to generate the numeric string. Add a fixed and discriminative prefix S and suffix E to the ciphertext to obtain the final to-be-broadcast text: text=S+X+E. The text is converted into an audio by TTS synthesis technology and then played. Here, text is a to-be-broadcast file, X is a numeric string obtained by encrypting, S is a predetermined prefix numeric string, such as 0000, and E is a predetermined suffix numeric string, such as 1111.

Step 204, converting the numeric string from text to speech to obtain an audio, and playing the audio.

In the present embodiment, the numeric string is converted into an audio by the TTS method. A target smart speaker that monitors the audio recognizes the numeric string after performing speech recognition on the audio, decrypts the recognized numeric string to obtain a character string, parses the name and the password of the wireless routing device from the character string obtained by decrypting, and connects to the wireless routing device by using the parsed name and password of the wireless routing device. The distance between the terminal and the smart speaker needs to be within a certain range, so that the smart speaker can monitor the audio played by the terminal. The terminal may repeatedly play the audio in a predetermined cycle. After the smart speaker monitors the audio, correctly parses the name and the password of the wireless routing device and successfully connects to the network, it may send to the terminal a message that the connection is successful, so that the terminal stops playing the audio. The smart speaker may also feed back to the terminal a message that the connection fails, such as a password error.

Figure 3:
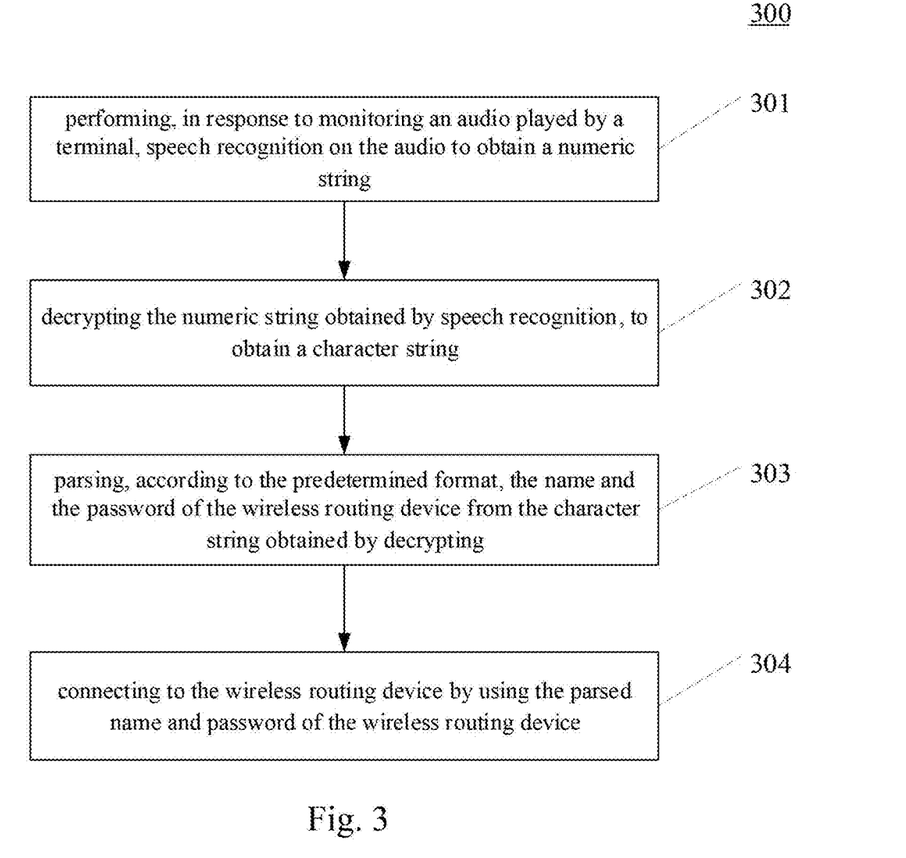
FIG. 3 is a flowchart of another embodiment of a method for interacting information according to the present disclosure.

With further reference to FIG. 3, a flow 300 of another embodiment of a method for interacting information according to the present disclosure is illustrated. The method for interacting information is applied to a smart speaker, and includes the following steps:

Step 301, performing, in response to monitoring an audio played by a terminal, speech recognition on the audio to obtain a numeric string.

In the present embodiment, an electronic device on which the method for interacting information operates (for example, the smart speaker shown in FIG. 1) may monitor an audio played by a terminal, and then convert the audio into a numeric string in text form by ASR (Automatic Speech Recognition) technology. Here, the audio is obtained by: the terminal combines information inputted by a user into a character string according to a predetermined format, and encrypts the character string to generate a numeric string, and then converts the numeric string from text to speech, where the information includes a name and a password of a wireless routing device. The generation process of the audio may refer to steps 201-204.

Step 302, decrypting the numeric string obtained by speech recognition to obtain a character string.

In the present embodiment, the numeric string recognized in step 301 is decrypted in accordance with a predetermined decryption method. If it is symmetric encryption, the numeric string may be decrypted using the secret key used in encryption. The final available decryption result is a character string combined according to the predetermined format based on the information in step 202.

In some alternative implementations of the present embodiment, the numeric string includes a predetermined prefix numeric string and a predetermined suffix numeric string. The decrypting the numeric string obtained by speech recognition to obtain a character string, includes: deleting the predetermined prefix numeric string and the predetermined suffix numeric string from the numeric string obtained by speech recognition, to obtain a target numeric string; and decrypting the target numeric string to obtain the character string. For example, the terminal adds a predetermined prefix numeric string S preceding the ciphertext, and adds a predetermined suffix numeric string E succeeding the ciphertext, to generate a numeric string text=S+X+E. The smart speaker converts the audio into text after receiving the audio. In addition, before decrypting, it is necessary to remove the prefix numeric string S and the suffix numeric string E in the text to obtain the numeric string X.

Step 303, parsing, according to the predetermined format, the name and the password of the wireless routing device from the character string obtained by decrypting.

In the present embodiment, in addition to the name and the password of the wireless routing device, the decrypted character string may also include some separators, such as commas. The name and the password of the wireless routing device may be parsed from the character string obtained by decryption according to the predetermined format according to which the character string is combined in step 202.

Step 304, connecting to the wireless routing device by using the parsed name and password of the wireless routing device.

In the present embodiment, the smart speaker may automatically attempt a network connection using the parsed name and password of the wireless routing device. If the connection is successful, the smart speaker may feed back to the terminal that it is not necessary to repeat playing the audio. If the connection fails, it may feedback the reason for the failure to the terminal, so that the terminal reselects the name and the password of the wireless routing device.

In some alternative implementations of the present embodiment, the information inputted by the user further includes a user identifier of the user. The method further includes: parsing the user identifier from the character string obtained by decrypting; and sending the user identifier to a target server for identity authentication. The target server is a server that may be used to register user information. After the wireless network connection is successfully established, the smart speaker may send the user identifier to the target server through the wireless routing device. The target server may authenticate the user, to prevent unauthorized users from controlling the smart speaker.

In some alternative implementations of the present embodiment, the method further includes: acquiring a device identifier of the smart speaker; and sending the device identifier to the target server to bind the device identifier and the user identifier. The device identifier may be a machine code or a mobile phone number. The terminal may also be bound to the smart speaker. The terminal may acquire the status of the smart speaker through the target server, and log in to the target server through the device identifier to check the status of the smart speaker.

Figure 4:
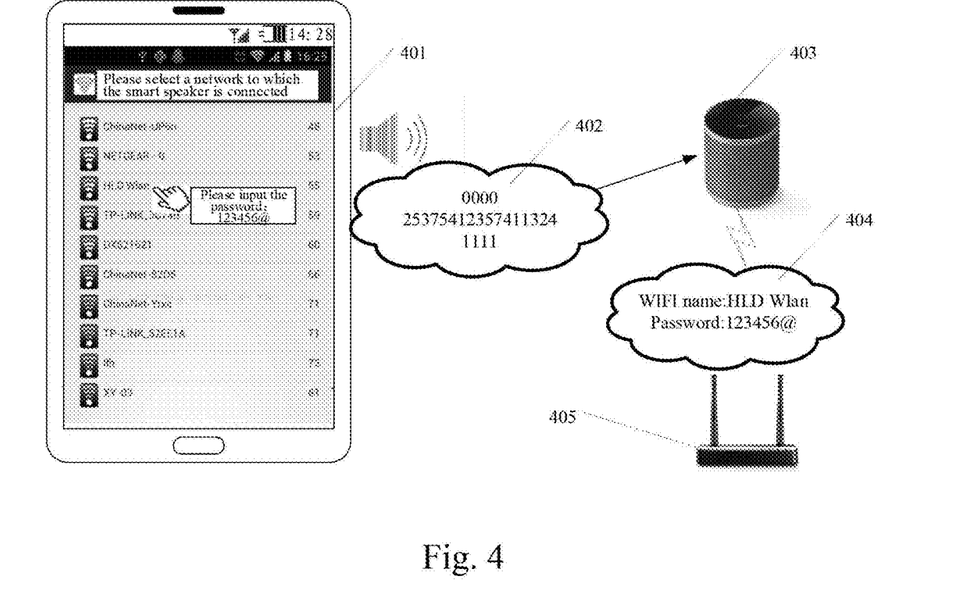
FIG. 4 is a schematic diagram of an application scenario of the method for interacting information according to some embodiments of the present disclosure.

With further reference to FIG. 4, FIG. 4 is a schematic diagram of an application scenario of the method for interacting information according to the present embodiment. In the application scenario of FIG. 4, a user selects, through a terminal 401, a wireless routing device to which a smart speaker 403 is to be connected, and inputs the password. The terminal converts the name and the password of the wireless routing device into a numeric string "25375412357411324" and after that adds the prefix 0000 and the suffix 1111. Then the generated numeric string 402 is converted into audio for playback. After the smart speaker monitors the audio, the audio is converted into the numeric string. The numeric string is decrypted after the prefix 0000 and the suffix 1111 are removed, and the name and the password 404 of the wireless routing device are extracted from the decrypted character string. Finally, the smart speaker 403 is connected to the wireless routing device 405 using the name and the password 404 of the wireless routing device.

The method provided by the above embodiments of the present disclosure converts, through a terminal, the name and the password of the wireless routing device in the form of a character string into an audio form for playing. The smart speaker converts the name and the password of the wireless routing device in audio form into the name and the password of the wireless routing device that may be in text form. In this regard, it is possible to configure the network connection of the smart speaker when the terminal cannot connect to the smart speaker through a network, thereby improving the success rate of configuring the network connection of the smart speaker.

Figure 5:
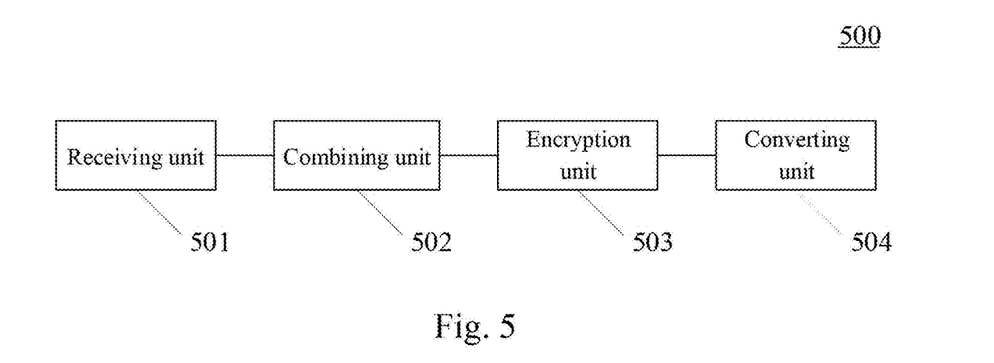
FIG. 5 is a schematic structural diagram of an embodiment of an apparatus for interacting information according to the present disclosure.

With further reference to FIG. 5, as an implementation to the method shown in the above figures, the present disclosure provides an embodiment of an apparatus for interacting information. The apparatus embodiment corresponds to the method embodiment shown in FIG. 2, and the apparatus may specifically be applied to various electronic devices.

As shown in FIG. 5, the apparatus 500 for interacting information of the present embodiment includes: a receiving unit 501, a combining unit 502, an encryption unit 503 and a converting unit 504. The receiving unit 501 is configured to receive information inputted by a user, the information including a name and a password of a wireless routing device. The combining unit 502 is configured to combine the information into a character string according to a predetermined format. The encryption unit 503 is configured to encrypt the character string into a numeric string. The converting unit 504 is configured to convert the numeric string from text to speech to obtain an audio, and play the audio, so that a target smart speaker monitoring the audio recognizes the numeric string after performing speech recognition on the audio, decrypts the recognized numeric string to obtain the character string, parses the name and the password of the wireless routing device from the character string obtained by decrypting, and connects to the wireless routing device by using the parsed name and password of the wireless routing device.

In the present embodiment, in the apparatus 500 for interacting information, the specific processing of the receiving unit 501, the combining unit 502, the encryption unit 503 and the converting unit 504 may refer to the step 201, step 202, step 203 and step 204 in the corresponding embodiment of FIG. 2.

In some alternative implementations of the present embodiment, the encryption unit 503 is further configured to: encrypt the character string to obtain a ciphertext in numeric form; and add a predetermined prefix numeric string preceding the ciphertext, and add a predetermined suffix numeric string succeeding the ciphertext to generate the numeric string.

In some alternative implementations of the present embodiment, the information further includes a user identifier of the user.

Figure 6:
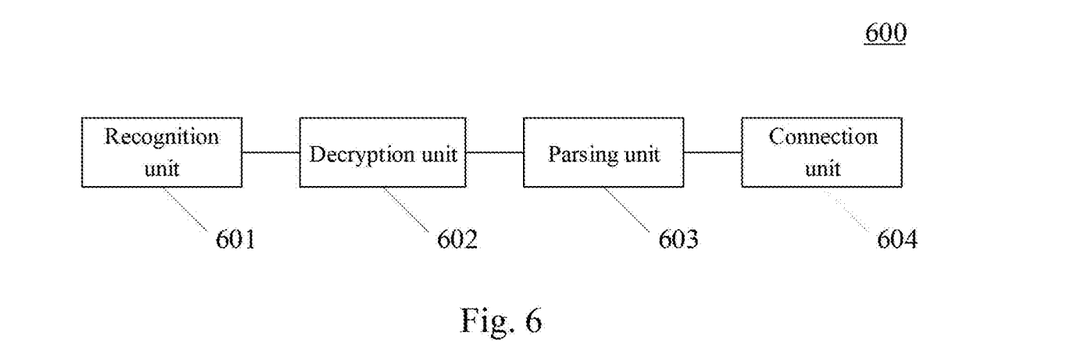
FIG. 6 is a schematic structural diagram of another embodiment of an apparatus for interacting information according to the present disclosure.

With further reference to FIG. 6, as an implementation to the method shown in the above figures, the present disclosure provides an embodiment of an apparatus for interacting information. The apparatus embodiment corresponds to the method embodiment shown in FIG. 3, and the apparatus may specifically be applied to various electronic devices.

As shown in FIG. 6, the apparatus 600 for interacting information of the present embodiment includes: a recognition unit 601, a decryption unit 602, a parsing unit 603 and a connection unit 604. The recognition unit 601 is configured to perform, in response to monitoring an audio played by a terminal, speech recognition on the audio to obtain a numeric string, where the audio is obtained by: the terminal combines information inputted by a user into a character string according to a predetermined format, and encrypts the character string to generate a numeric string, and then converts the numeric string from text to speech, the information includes a name and a password of a wireless routing device. The decryption unit 602 is configured to decrypt the numeric string obtained by speech recognition to obtain the character string. The parsing unit 603 is configured to parse, according to the predetermined format, the name and the password of the wireless routing device from the character string obtained by decrypting. The connection unit 604 is configured to connect to the wireless routing device by using the parsed name and password of the wireless routing device.

In the present embodiment, in the apparatus 600 for interacting information, the specific processing of the recognition unit 601, the decryption unit 602, the parsing unit 603 and the connection unit 604 may refer to the step 301, step 302, step 303 and step 304 in the corresponding embodiment of FIG. 3.

In some alternative implementations of the present embodiment, the numeric string includes a predetermined prefix numeric string and a predetermined suffix numeric string. The decryption unit 602 is further configured to: delete the predetermined prefix numeric string and the predetermined suffix numeric string from the numeric string obtained by speech recognition to obtain a target numeric string; and decrypt the target numeric string to obtain the character string.

In some alternative implementations of the present embodiment, the information inputted by the user further includes a user identifier of the user. The apparatus 600 further includes an authentication unit, configured to: parse the user identifier from the character string obtained by decrypting; and send the user identifier to a target server for identity authentication.

In some alternative implementations of the present embodiment, the apparatus 600 further includes a binding unit, configured to: acquire a device identifier of the smart speaker; and send the device identifier to the target server to bind the device identifier and the user identification.

Figure 7:
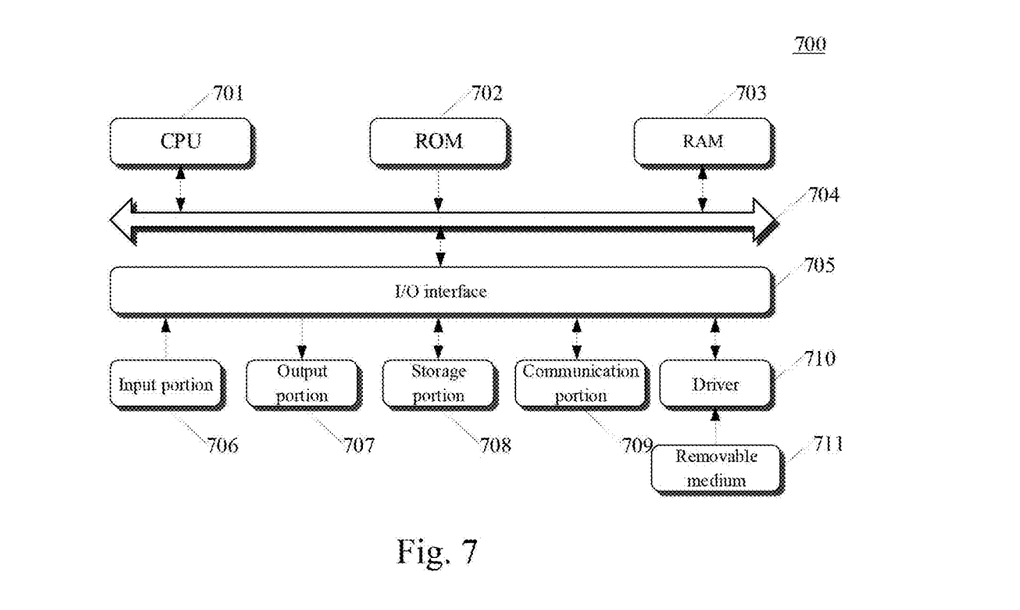
FIG. 7 is a schematic structural diagram of a computer system adapted to implement an electronic device of the embodiments of the present disclosure.

Referring to FIG. 7, a schematic structural diagram of a computer system 700 adapted to implement an electronic device (for example, the terminal device/smart speaker shown in FIG. 1) of the embodiments of the present disclosure is shown. The electronic device shown in FIG. 7 is only an example, and should not limit a function and scope of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, a microphone, etc.; an output portion 707 including a liquid crystal display device (LCD), a speaker, etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the method of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a receiving unit, a combining unit, an encryption unit and a converting unit. Here, the names of these units do not in some cases constitute a limitation to such units themselves. For example, the receiving unit may also be described as "a unit for receiving information inputted by a user."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: receive information inputted by a user, the information including a name and a password of a wireless routing device; combine the information into a character string in a predetermined format; encrypt the character string into a numeric string; convert the numeric string from text to speech to obtain an audio, and play the audio, so that a target smart speaker monitoring the audio recognizes the numeric string after performing speech recognition on the audio, decrypts the recognized numeric string to obtain a character string, parses the name and the password of the wireless routing device from the character string obtained by decrypting, and connects to the wireless routing device by using the parsed name and password of the wireless routing device. Or cause the apparatus to: perform speech recognition on the audio to obtain a numeric string, in response to monitoring an audio played by a terminal, the audio being obtained by the terminal combining information inputted by a user into a character string in a predetermined format, and encrypting the character string to generate a numeric string, and then converting the numeric string from text to speech, and the information including a name and a password of a wireless routing device; decrypt the numeric string obtained by speech recognition to obtain a character string; parse the name and the password of the wireless routing device from the character string obtained by decrypting in the predetermined format; and connect to the wireless routing device by using the parsed name and password of the wireless routing device.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure.

Technical schemes formed by the above-described features being interchanged with, but not limited to, technical features with similar functions disclosed in the present disclosure are examples.

What is claimed is:

1. A method for interacting information, applied to a terminal, comprising:
receiving information inputted by a user, the information comprising a name and a password of a wireless routing device;
combining the information into a character string according to a predetermined format;
encrypting the character string into a numeric string; and
converting the numeric string from text to speech to obtain an audio, and playing the audio, so that a target smart speaker monitoring the audio recognizes the numeric string after performing speech recognition on the audio, decrypts the recognized numeric string to obtain the character string, parses the name and the password of the wireless routing device from the character string obtained by decrypting, and connects to the wireless routing device by using the parsed name and password of the wireless routing device,
wherein the method is performed by at least one processor.

2. The method according to claim 1, wherein the encrypting the character string into a numeric string comprises:
encrypting the character string to obtain a ciphertext in numeric form; and
adding a predetermined prefix numeric string preceding the ciphertext, and adding a predetermined suffix numeric string succeeding the ciphertext, to generate the numeric string.

3. The method according to claim 1, wherein the information further comprises a user identifier of the user.

4. A non-transitory computer readable medium, storing a computer program thereon, the program, when executed by a processor, implements the method according to claim 1.

5. A method for interacting information, applied to a smart speaker, comprising:
performing, in response to monitoring an audio played by a terminal, speech recognition on the audio to obtain a numeric string, wherein the audio is obtained by: the terminal combines information inputted by a user into a character string according to a predetermined format, encrypts the character string to generate a numeric string, and then converts the numeric string from text to speech, the information comprises a name and a password of a wireless routing device;
decrypting the numeric string obtained by speech recognition to obtain the character string;
parsing, according to the predetermined format, the name and the password of the wireless routing device from the character string obtained by decrypting; and
connecting to the wireless routing device by using the parsed name and password of the wireless routing device.

6. The method according to claim 5, wherein the numeric string comprises a predetermined prefix numeric string and a predetermined suffix numeric string; and
the decrypting the numeric string obtained by speech recognition to obtain the character string, comprises:
deleting the predetermined prefix numeric string and the predetermined suffix numeric string from the numeric string obtained by speech recognition, to obtain a target numeric string; and
decrypting the target numeric string to obtain the character string.

7. The method according to claim 5, wherein the information inputted by the user further comprises a user identifier of the user; and
the method further comprises:
parsing the user identifier from the character string obtained by decrypting; and
sending the user identifier to a target server for identity authentication.

8. The method according to claim 7, the method further comprising:
acquiring a device identifier of the smart speaker; and
sending the device identifier to the target server to bind the device identifier and the user identifier.

9. An apparatus for interacting information, applied to a smart speaker, comprising:
at least one processor; and
a memory storing instructions, the instructions when executed by the at least one processor, cause the at least one processor to perform the method according to claim 5.

10. The apparatus according to claim 9, wherein the numeric string comprises a predetermined prefix numeric string and a predetermined suffix numeric string; and
the decrypting the numeric string obtained by speech recognition to obtain the character string, comprises:
deleting the predetermined prefix numeric string and the predetermined suffix numeric string from the numeric string obtained by speech recognition, to obtain a target numeric string; and
decrypting the target numeric string to obtain the character string.

11. The apparatus according to claim 9, wherein the information inputted by the user further comprises a user identifier of the user; and the method further comprises:
parsing the user identifier from the character string obtained by decrypting; and
sending the user identifier to a target server for identity authentication.

12. The apparatus according to claim 11, wherein to the method further comprises:
acquiring a device identifier of the smart speaker; and
sending the device identifier to the target server to bind the device identifier and the user identifier.

13. A non-transitory computer readable medium, storing a computer program thereon, the program, when executed by a processor, implements the method according to claim 5.

14. An apparatus for interacting information, applied to a terminal, comprising:
at least one processor; and
a memory storing instructions, the instructions when executed by the at least one processor, cause the at least one processor to perform operations, the operations comprising:
receiving information inputted by a user, the information comprising a name and a password of a wireless routing device;
combining the information into a character string according to a predetermined format;
encrypting the character string into a numeric string; and
converting the numeric string from text to speech to obtain an audio, and playing the audio, so that a target smart speaker monitoring the audio recognizes the numeric string after performing speech recognition on the audio, decrypts the recognized numeric string to obtain the character string, parses the name and the password of the wireless routing device from the character string obtained by decrypting, and connects to the wireless routing device by using the parsed name and password of the wireless routing device.

15. The apparatus according to claim 14, wherein the encrypting the character string into a numeric string comprises:

encrypting the character string to obtain a ciphertext in numeric form; and adding a predetermined prefix numeric string preceding the ciphertext, and adding a predetermined suffix numeric string succeeding the ciphertext, to generate the numeric string.

16. The apparatus according to claim 14, wherein the information further comprises a user identifier of the user.

* * * * *